May 8, 1934.   P. H. JOHNSTON   1,957,836
EYEGLASS OR SPECTACLE MOUNTING AND METHOD OF MAKING SAME
Filed April 20, 1931

PAUL H. JOHNSTON INVENTOR.

BY
Merrill M. Blackburn
ATTORNEY.

Patented May 8, 1934

1,957,836

UNITED STATES PATENT OFFICE 1,957,836

EYEGLASS OR SPECTACLE MOUNTING AND METHOD OF MAKING SAME

Paul H. Johnston, Davenport, Iowa

Application April 20, 1931, Serial No. 531,282

2 Claims. (Cl. 88—47)

The present invention relates to eyeglass or spectacle mountings and method of making same and more particularly to improvements in glasses of the type illustrated by the following patents: 528,528 Borsch Nov. 6, 1894, 1,283,600 Thomassen Nov. 5, 1918, and 1,501,085 Wrighton July 15, 1924.

Among the objects of this invention are to provide an improved mounting of the nature indicated and a method of manufacture thereof; to provide a mounting having a cushion to separate the glass from the metal, the cushion forming an integral part of the mounting; to provide a structure of the character indicated such that it will not be necessary for the operative putting the glass and the mounts together to handle separately the cushioning material; and such further objects, advantages and capabilities as will hereafter appear and as are inherent in the construction disclosed herein. My invention further resides in the method of manufacture disclosed hereinafter and in the combination, construction and arrangement of parts illustrated in the accompanying drawing and, while I have shown therein what is now considered the preferred embodiment of this invention, I desire the same to be understood as illustrative only and not to be interpreted in a limiting sense.

The structures shown in all three of the patents referred to above are subject to the same objection, namely, the cushioning material is a separate element from both the lens and the lens mount, hence the operative, in assembling these parts, has the difficult task of getting the cushioning material properly located inside of the ears of the lens mount and then getting the lens inserted between the ears of the cushion and finally getting the screw inserted through the holes provided therefor and screwed to place in the lens mount. In a factory equipped to handle the work of putting the cushions in the mounts, there is little difficulty in doing this work. These cushions may therefore be put in place in the factory and caused to adhere permanently to the lens mounts and the operative mounting the lens in the mount, under ordinary working conditions, is not bothered by keeping the cushion in place while getting the lens in place.

The structure disclosed in the Wrighton patent is further subject to the objection that the cushion material is made to adhere also to the lenses, as well as to the lens mounts, and, when it is necessary to remove the lens from its mount, it is difficult to do so and may even result in the breakage of the lens. My construction, on the other hand, comprises a lens mount having a cushion permanently adherent thereto which does not adhere to the lens when the latter is put in place. Therefore, with my construction, it is easy to insert and remove the lens and the use of the cushion does not necessitate the use of special tools or special training.

There are various patents disclosing the idea of using a separate sleeve in the opening through the lens through which the lens screw passes but none of these are relevant to the present invention. Also, there are several patents disclosing the idea of cementing the lens and the lens mount together but this method has been discarded because it has been found that the cement lacks permanence, in view of the fact that it is attacked by perspiration. Also, the cement is hard and therefore furnishes no cushioning effect. For these reasons it has been completely abandoned.

It is now believed that the problem which I have successfully solved has been fully set forth and the invention will be described in connection with the accompanying drawing in which Fig. 1 shows an elevation of a structure embodying my present invention, a pair of lenses being indicated in place in the lens mount, by means of broken lines;

Figure 1:
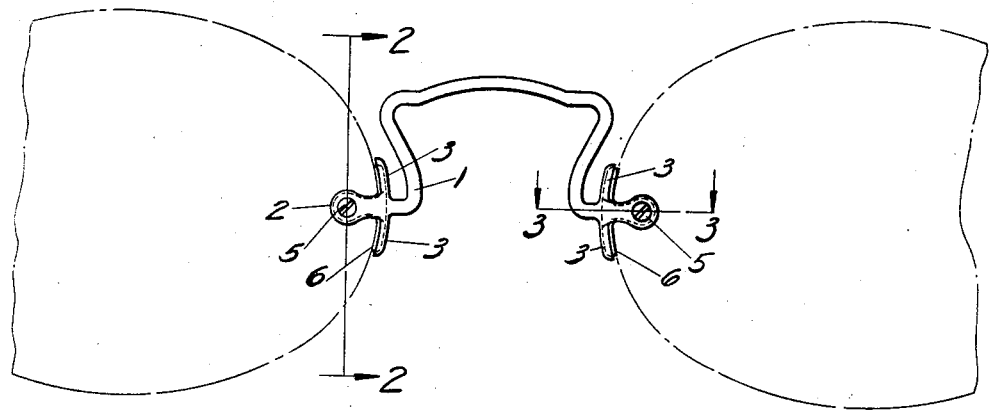
Figure 2:
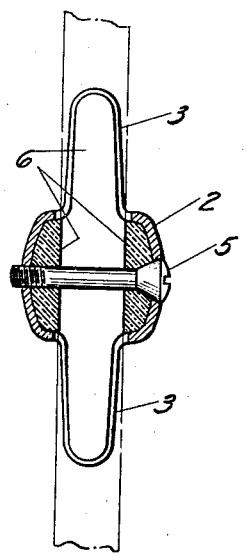
Fig. 2 is a transverse section substantially along the plane indicated by the line 2—2, Fig. 1.
Figure 3:
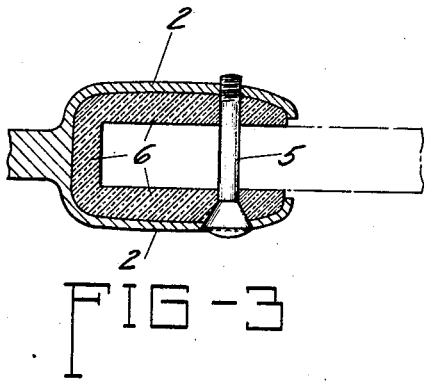
Fig. 3 is a horizontal section substantially along the plane indicated by the line 3—3, Fig. 1.
Figure 4:
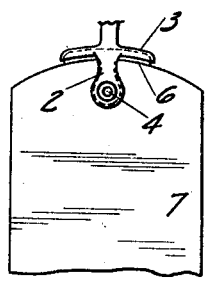
Fig. 4 shows one step in the process of manufacture of a lens mount in accordance with my invention.

The lens mount is denoted in general by the numeral 1 and is shown as provided with ears 2 and straps 3, as is customary. Through the ears extend holes 4 for the reception of lens screws 5 which draw the ears together and compress somewhat the cushioning material 6 which is mounted in the lens mount and made an integral part thereof.

This cushion is cut from a composition having durable and elastic properties, one face of the material being coated with a liquid compound which under the influence of heat causes the permanent union of the parts. The other surface of the cushioning material is so finished that the application of heat thereto does not cause it to adhere to a solid pressed against it.

As will be apparent from the drawing, the straps and ears are made somewhat concave so that a portion of the cushioning material will be located within the concavity and a portion thereof will project beyond the concavity, as indicated in the various figures of the drawing. In the manufacture of the lens mount, blocks 7 of suitable size and material are inserted between the ears of the lens mount and between the ears of the cushioning material, said blocks placing the cushioning material under slight compression. Also, these blocks are forced in until the body and straps of the cushioning material are placed under slight compression and pins are then put through the openings 4 of the ears to hold the blocks 7 in position so as to keep the material 6 under compression. Of course, if it be so desired, screws 5 may be inserted in the openings 4 to hold the blocks 7 in place and draw the ears 2 together but, since these blocks have a sufficient thickness and the ears have sufficient rigidity to hold the cushioning material under compression, it is ordinarily not necessary to use lens screws at this time. The use of pins for this purpose is really very much to be preferred on account of the simplicity of operation and the reduction in the amount of time required in fastening the blocks 7 in place.

The term "eyeglasses" as used in this specification and the appended claims is intended to include not only noseglasses but also spectacles, or, in other words, all aids to vision which include lenses and lens mounts provided with ears whereby the lenses may be secured in the mounts.

It is believed that the present invention has been made clear in the foregoing disclosure and, therefore, having described my invention, I claim:

1. As an article of manufacture, an eyeglass mounting having lens holding ears and straps provided on their faces toward the lens with depressions and having resilient lining in the depressions and unitarily joined to the metal during the manufacture of the mounting, said lining having a surface exposed to the lens which is non-adherent with relation thereto, and said ears having screw-receiving openings therein for reception of the lens-holding screw.

2. The method of making eyeglass mounts comprising forming a metallic frame element having lens-holding ears and straps having depressions in their inner faces directed toward the lens when same is mounted, forming from a previously prepared yieldable material having one face adherent and its opposite face non-adherent a yieldable lining for the ears and straps to fit in said depressions, applying the lining to the lens-holding parts with its adherent surface directed toward the metal, forcing the lining into intimate contact with the ears and straps, and heating the assembled structure while under pressure to cause the lining to be substantially permanently united to the metal parts only.

PAUL H. JOHNSTON.